US011252681B1

(12) United States Patent
Marupaduga

(10) Patent No.: US 11,252,681 B1
(45) Date of Patent: Feb. 15, 2022

(54) ADJUSTING REPORTING FREQUENCY OF BUFFER STATUS AND/OR POWER HEADROOM BASED ON PACKET LOSS

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/904,879

(22) Filed: Jun. 18, 2020

(51) Int. Cl.
*H04W 52/36* (2009.01)
*H04W 28/02* (2009.01)
*H04L 1/00* (2006.01)
*H04L 43/0829* (2022.01)
*H04W 52/42* (2009.01)

(52) U.S. Cl.
CPC ......... *H04W 52/365* (2013.01); *H04L 1/0003* (2013.01); *H04L 43/0829* (2013.01); *H04W 28/0278* (2013.01); *H04W 52/42* (2013.01)

(58) Field of Classification Search
None
See application file for complete search history.

(56) References Cited

U.S. PATENT DOCUMENTS

| | | | |
|---|---|---|---|
| 8,351,326 B2 | 1/2013 | Parker | |
| 9,426,790 B2 | 8/2016 | Park et al. | |
| 10,397,824 B2 | 8/2019 | Lee et al. | |
| 2020/0145881 A1* | 5/2020 | Mitra | H04L 5/0078 |
| 2020/0252882 A1* | 8/2020 | Charipadi | H04W 52/325 |
| 2020/0288412 A1* | 9/2020 | Ajdakple | H04L 5/0092 |
| 2021/0051606 A1* | 2/2021 | Yang | H04W 52/365 |
| 2021/0153142 A1* | 5/2021 | Lee | H04W 52/365 |

* cited by examiner

*Primary Examiner* — Anh Vu H Ly

(57) ABSTRACT

A method for adjusting the frequency of one or both of buffer status reporting and power headroom reporting of a wireless device includes identifying a wireless device positioned at an edge portion of a coverage area of an access node, determining a packet loss associated with data transmission from the access node through the cell site router to an external network communicatively coupled to the cell site router, and based at least in part on the packet loss, adjusting one or both of a buffer status reporting frequency of the wireless device and a power headroom reporting frequency of the wireless device. Systems and devices relate to adjusting the frequency of one or both of buffer status reporting and power headroom reporting of a wireless device.

20 Claims, 7 Drawing Sheets

ADJUSTING REPORTING FREQUENCY OF BUFFER STATUS AND/OR POWER HEADROOM BASED ON PACKET LOSS

TECHNICAL BACKGROUND

As wireless networks evolve and grow, there are ongoing challenges in providing high-quality service to increasing numbers of wireless devices in various coverage areas of a wireless network. In particular, wireless devices positioned near an edge of a coverage area of an access node can suffer from diminished quality of service and throughput as compared to a wireless device more centrally located in the coverage area. One approach that can contribute generally to maintaining high quality of service includes periodically reporting various status parameters of the wireless device to the access node. Such status parameters can include buffer status, available power headroom, or other parameters. Providing information about these status parameters can enhance the quality of service by increasing the information available to the access node for initiating actions such as handovers between access nodes and/or frequency bands. Additionally, reporting buffer status and power headroom with a relatively higher frequency can support a higher quality of service by ensuring changes in status of the wireless device that negatively affect quality of service (such as a higher buffer status and/or lower available power headroom) are reported to the access node so that quality of service can be maintained. However, the reporting of status parameters itself consumes network resources that would otherwise be available to support a higher quality of service, and therefore overly frequent reporting of status parameters is undesirable.

OVERVIEW

Exemplary embodiments described herein include systems, methods, and node for adjusting one or both of a buffer status reporting frequency and a power headroom reporting frequency. For example, a method for adjusting one or both of a buffer status reporting frequency and a power headroom reporting frequency comprises identifying a wireless device positioned at an edge portion of a coverage area of an access node, determining a packet loss associated with data transmission from the access node through the cell site router to an external network communicatively coupled to the cell site router, and based at least on the packet loss, adjusting one or both of the buffer status reporting frequency of the wireless device and the power headroom reporting frequency of the wireless device.

An exemplary system described herein for adjusting one or both of a buffer status reporting frequency and a power headroom reporting frequency of a wireless device includes an access node configured to provide wireless service to a wireless device attached to the access node, a cell site router communicatively coupled to the access node, the cell site router being configured to transmit data between the access node and an external network, and a processor communicatively coupled to the cell site router. The processor is configured to perform operations comprising identifying a wireless device reporting a low power headroom to the access node; determining a packet loss associated with data transmission from the access node through the cell site router to an external network communicatively coupled to the cell site router; and based at least in part on the packet loss, adjusting one or both of the buffer status reporting frequency of the wireless device and the power headroom reporting frequency of the wireless device.

An exemplary processing node described herein for adjusting one or both of a buffer status reporting frequency and a power headroom reporting frequency of a wireless device is configured to perform operations comprising: identifying a wireless device reporting a high buffer status to an access node; determining a packet loss associated with data transmission from the access node through the cell site router to an external network communicatively coupled to the cell site router; and based at least in part on the packet loss, adjusting one or both of a buffer status reporting frequency of the wireless device and a power headroom reporting frequency of the wireless device.

DETAILED DESCRIPTION

Figure 1:
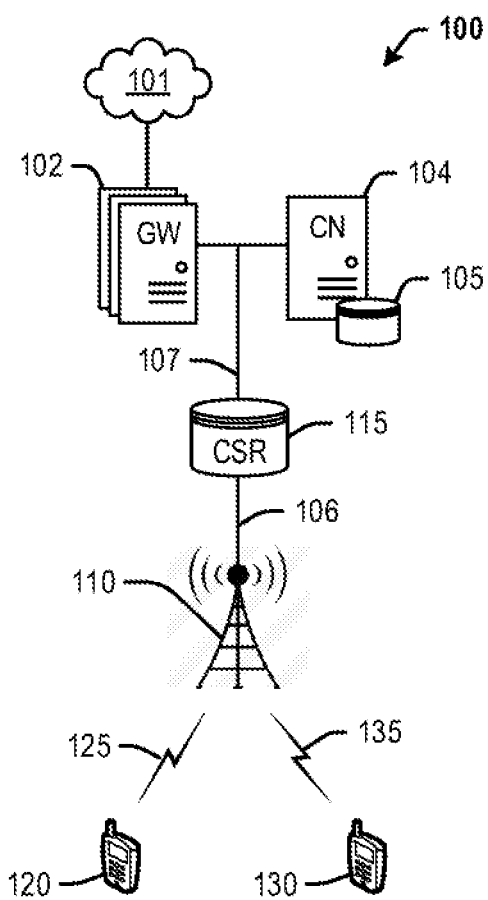
FIG. 1 depicts an exemplary system for adjusting a buffer status reporting frequency and/or power headroom reporting frequency of a wireless device.

Exemplary embodiments described herein include systems, methods, and processing nodes for adjusting the frequency of one or both of buffer status reporting and power headroom reporting of a wireless device. As discussed above, wireless devices attached to access nodes may periodically transmit information regarding a buffer status of the wireless device and an available power headroom of the wireless device. Reported conditions such as a high buffer status, i.e., a transmission backlog between the wireless device and the access node, and/or a low available power headroom, can be indicative that the wireless device is positioned near an edge of a coverage area of an access node. When a wireless device is positioned at the edge of a coverage area provided by an access node, overall throughput and quality of service can be negatively impacted. For example, outgoing data packets being sent from a cell site router to a network/gateway node may be lost due to a full buffer or other issues related to congestion at the cell site router. Further, outgoing data packets may fail to transmit due to insufficient power headroom.

Accordingly, in exemplary embodiments of the disclosure, the frequency of reporting the buffer status and/or the power headroom status can be adjusted based on occurrence of packet losses at a cell site router associated with an access node to which the wireless device is attached (i.e., packet losses on backhaul). Exemplary cell site routers described herein include any node that is configured to route incoming data packets from a network/gateway node to an access node, and to route outgoing data packets from the access node (and originating at wireless devices attached thereto) to the network/gateway node. For at least the reasons discussed above, dropped packets occurring at cell site routers can negatively impact an overall throughput and quality of service for wireless devices, particularly when the access nodes serving the wireless devices are heavily loaded and/or when the wireless device is located at an edge of a cell coverage area defined by the access node.

Wireless devices located at the cell edge can be identified in various ways. For example, a wireless device located at the cell edge may exhibit a relatively high buffer status, a relatively low power headroom, and/or a relatively low signal strength. Additionally, wireless devices located at the edge of the coverage area may use a specific modulation and coding scheme (MCS) that identifies them as "edge" users. Wireless devices at the cell edge can also be identified using global positioning system (GPS) information, cell tower triangulation, or other latitude/longitude measures, or may exhibit other characteristics or parameters indicative of a position at or near an edge of the coverage area.

When a wireless device is identified as being near the cell service edge, and packet losses associated with the wireless device are occurring, the buffer status reporting frequency and/or the power headroom reporting frequency can be increased for the wireless device. For example, the reporting frequency of the buffer status reporting can be increased from every 60-120 milliseconds to higher frequency, such more frequently than every 60 milliseconds. Likewise, the reporting frequency for the power headroom reporting can be increased from every 60-120 milliseconds to a higher frequency, such as more frequently than every 60 milliseconds.

As a result of the more frequent reporting of buffer status and/or power headroom status, wireless devices positioned at the edge of cell service receive greater priority for uplink transmissions as compared to wireless devices not located at the edge of the coverage area. For example, the greater frequency of buffer status and/or power headroom of the wireless device enables the access node to more quickly recognize and mitigate transmission issues that may be occurring between the wireless device and the access node, thereby enhancing quality of service.

In addition, in exemplary embodiments of the disclosure, resources of the access node or other network components can be prioritized for the wireless device for which reporting frequency has been increased. Such prioritization can include, without limitation, preferential assignment of certain channels and/or frequency bands to the wireless device, dedication of greater transmission power to downlink transmissions to the wireless device, and/or prioritization of other network resources.

FIG. 1 depicts an exemplary system for adjusting frequency of one or both of buffer status reporting and power headroom reporting. System 100 comprises a communication network 101, gateway node(s) 102, controller node 104, access node 110, cell site router 115, and wireless devices 120 and 130. In other embodiments, any other combination of cell site routers, access nodes, and wireless devices may be evident to those having ordinary skill in the art in light of this disclosure. In this exemplary embodiment, access node 110 may be a macrocell access node configured to deploy wireless air-interfaces 125, 135 to which wireless devices 120, 130 can respectively attach. For example, access node 110 can include a combination of a 4G eNodeB and a 5G gNodeB. In other words, the access node 110 can comprise antennae that are configured to communicate using 4G LTE (i.e. a first radio access technology, "RAT") as well as antennae that are configured to communicate using 5G NR (a second RAT). Further, the access node 110 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Consequently, wireless devices 120, 130 are respectively capable of attaching to 4G and 5G RATs. Further, cell site router 115 includes any node that is configured to route incoming data packets from network 101 and/or gateway node(s) 102 to access node 110 (and wireless devices 120, 130), and to route outgoing data packets received from the access node 110 (and originating at wireless devices 120, 130) to the gateway node(s) 102 and/or network 101.

Further, as described herein, cell site router 115 is configured to adjust one or both of a buffer status reporting frequency and a power headroom reporting frequency of a wireless device positioned near an edge of the coverage area. Such wireless devices can be identified based on a high buffer status, a low available power headroom, a GPS location, a chosen MCS, and/or other factors. Because reporting buffer status and available power headroom itself consumes network resources, it is beneficial to provide relatively higher frequency of reporting only when issues with quality of service arise, to avoid consuming network resources that could otherwise be dedicated to providing a higher quality of service. As described herein, such adjustments to reporting frequency can be made for wireless devices positioned at an edge of a coverage area of an access node based on the occurrence of dropped packets at the cell site router and/or other backhaul issues indicative of a high level of congestion at the cell site router.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107.

Wireless device 120 may be any device, system, combination of devices, or other such communication platform capable of communicating wirelessly with access node 110 using one or more frequency bands deployed therefrom.

Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1, S4, S5, S11, S1-MME, or S1-U communication links. Other wired or wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as historical trends of packet losses at cell site router 115, associations between buffer size adjustments and different QoS requirements, and so on. This information may be requested by or shared with cell site router 115, gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
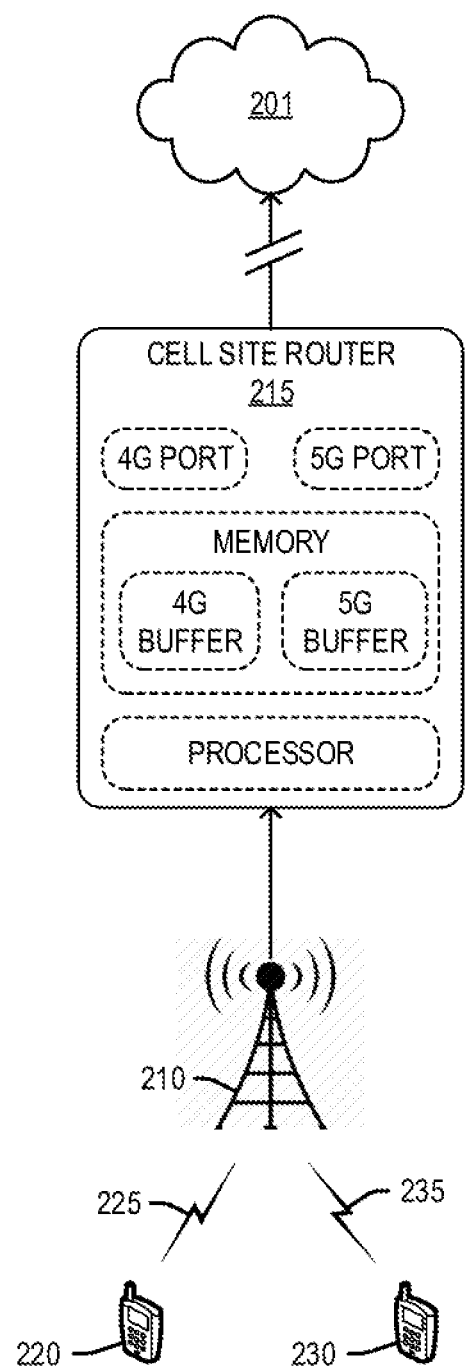
FIG. 2 depicts a schematic of an exemplary cell site router.

FIG. 2 depicts a schematic of an exemplary cell site router. Similar to system 100, cell site router 215 is illustrated as being coupled to an access node 210, and capable of communicating with core network 202 (which can include gateway nodes, controller nodes, and other interfaces to an external network). Cell site router 215 can include any node that is configured to route data packets between core network 202 and access node 210 via one or more ports. In addition to a processor and a memory, cell site router 215 is illustrated as having 4G ports and 5G ports which are used to transport data packets that are associated with 4G and/or 5G RATs. In addition, the memory stores at least a 4G buffer and a 5G buffer, respectively associated with the 4G port and the 5G port. Further, cell site router 215 (or a processing node communicatively coupled thereto) is configured to determine a packet loss associated with a data transmission between a source node and a destination node. The source node may be any of wireless devices 220, 230, and the destination node can be any node associated with network 201, such that the cell site router 215 is configured to receive a data transmission from the access node 210, and forward the data transmission to the destination node (via the network 201 and/or any intervening gateway nodes). In other words, the data transmission may be an uplink data transmission. Alternatively or in addition, the source node is any network node associated with network 201, the destination node is one of wireless devices 220, 230 attached to the access node 210, and the cell site router 215 is configured to receive the data transmission from the source node and transmit the data transmission to the wireless device 220, 230 via the access node 210. In other words, the data transmission can be a downlink data transmission.

In either case, the uplink and/or the downlink data transmission traverses a buffer of the cell site router 215 that is associated with a RAT that the data transmission utilizes, such as 3G, 4G, 5G, TDD, FDD, etc. Thus, the cell site router 215 may include a plurality of ports as shown herein, each associated with a different radio access technology. For example, data transmissions using 4G are transmitted via a 4G port of the cell site router 215, data transmissions using 5G are transmitted via a 5G port of the cell site router 215, and so on.

As described herein, responsive to determining occurrence of packet loss associated with a wireless device (e.g., wireless devices 120, 220, 230) located near an edge of coverage area of an access node (e.g., access node 110, 210), the frequency with which the buffer status and/or the power headroom of wireless device is reported is increased. For example, based on occurrence of packet drops being detected, a frequency of the buffer status reporting and/or power headroom reporting for the wireless device can be increased from a baseline frequency in a range of, for example, every 60-120 milliseconds, to an increased reporting rate, such as more frequently than every 60 milliseconds.

Figure 3:
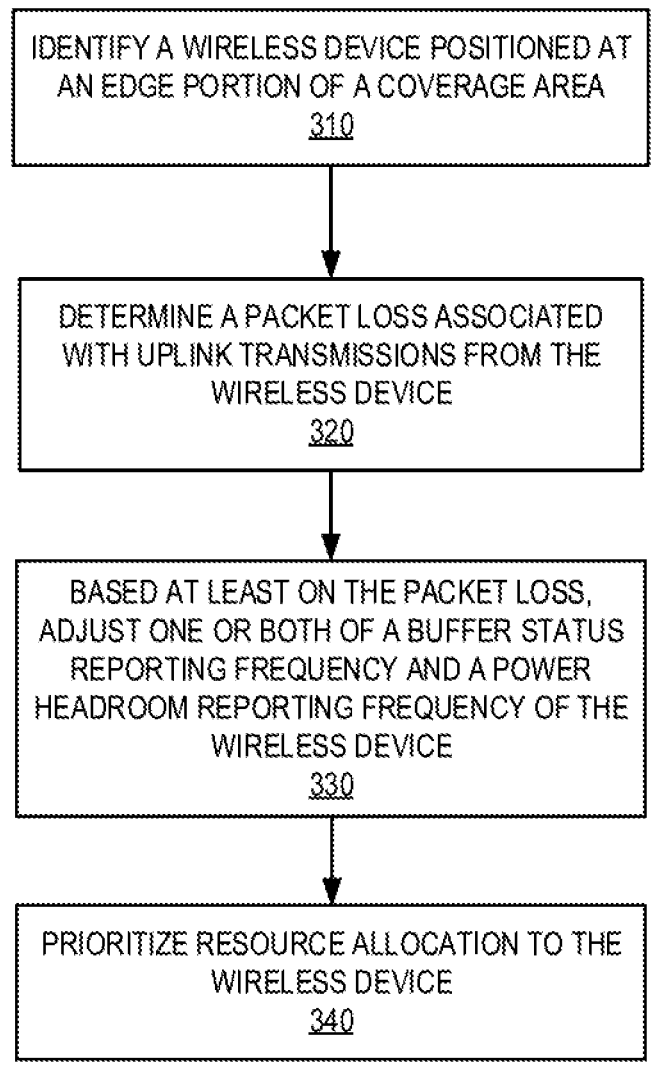
FIG. 3 depicts an exemplary method for adjusting a buffer status reporting frequency and/or power headroom reporting frequency of a wireless device.

FIG. 3 depicts an exemplary method for adjusting one or both of a buffer status reporting frequency and a power headroom reporting frequency of a wireless device. Although FIG. 3 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 310, the method includes identifying a wireless device positioned at an edge portion of a coverage area of an access node. Such identification can be based on factors including, but not limited to, a relatively high buffer status of the wireless device, a relatively low available power headroom of the wireless device, a specific MCS used by the wireless device, a GPS location of the wireless device, physical location information using tower triangulation, or other factors.

Once a wireless device located at an edge of a coverage area of the access node has been identified at 310, the method includes, at 320, determining a packet loss associated with uplink transmissions from the wireless device. Such packet losses may occur, for example, as a result of congestion at a cell site router. The packet loss can be associated with a data transmission between the wireless device and a destination node. For example, the destination node can be any node associated with an external network communicatively coupled to the gateway node, and the cell site router is configured to receive the data transmission from the access node and transmit the data transmission to the destination node via the gateway node.

At 330, based at least in part on the packet loss determined at 320, the method includes adjusting one or both of the buffer status reporting frequency and the power headroom reporting frequency of the wireless device. For example, the buffer status reporting frequency can be increased beyond a baseline frequency in a range of, for example, every 60-120 milliseconds, to an increased reporting rate, such as more frequently than every 60 milliseconds. Likewise, the power headroom reporting frequency can be increased beyond a baseline frequency in a range of, for example, every 60-120 milliseconds, to an increased reporting rate, such as more frequently than every 60 milliseconds. The increased buffer status reporting frequency and/or increased power headroom reporting frequency can be maintained for the time the wireless device is located near the edge of the coverage area, as determined by, for example, buffer status, power headroom, GPS location, specific MCS used, or other factors as discussed above. The buffer status reporting frequency and/or power headroom reporting frequency can be returned to the baseline frequency based on the position of the wireless device changing from a position at an edge of the coverage area of the access node to a position within the edge of the coverage area of the access node. Such a position change can be determined by one or more of a reduction in reported buffer status, greater reported power headroom, and a change in GPS location and/or MCS indicating a closer proximity of the wireless device to the access node.

At 340, the method optionally includes prioritizing resource allocation to the wireless device located at the edge of the coverage area, as identified at 310. Such resource allocation can include, for example, preferentially assigning frequency bands and/or channels to the wireless device, increasing a power level of transmissions to the wireless device, or other prioritizations of network resources. While these examples of prioritizing resource allocation are discussed here in connection with the method of FIG. 3, such prioritization is equally applicable to any other method and system disclosed herein.

Figure 4:
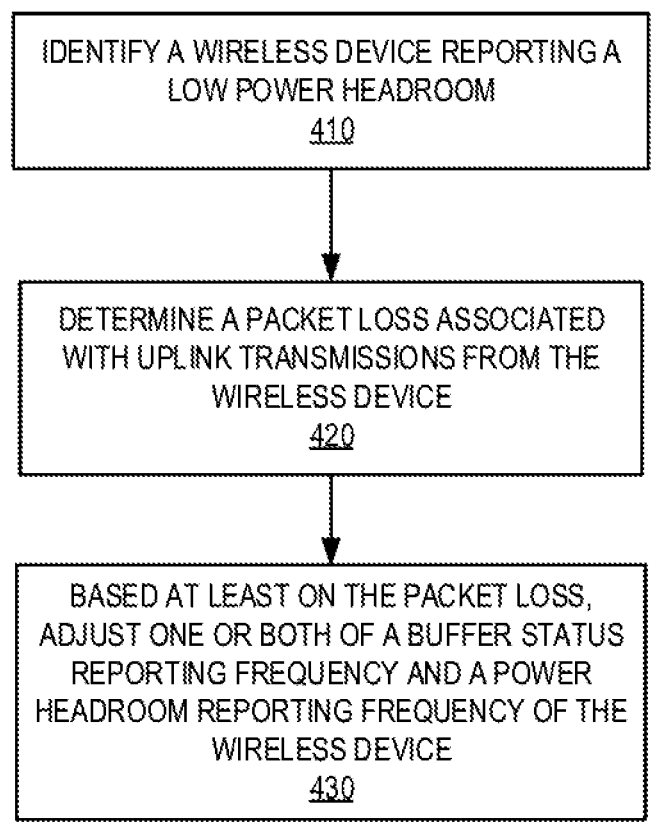
FIG. 4 depicts another exemplary method for adjusting a buffer status reporting frequency and/or power headroom reporting frequency of a wireless device.

FIG. 4 depicts an exemplary method for adjusting one or both of a buffer status reporting frequency and a power headroom reporting frequency of a wireless device. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, the method includes identifying a wireless device reporting a low power headroom, such as a power headroom below a predetermined threshold. Based on the identification of the wireless device reporting low power headroom, the method includes, at 420, determining a packet loss occurring, for instance, as a result of congestion at a cell site router, as discussed above in connection with FIG. 3. At 430, based at least in part on the packet loss determined at 420, the method includes the method includes adjusting one or both of the buffer status reporting frequency and the power headroom reporting frequency of the wireless device. For example, the buffer status reporting frequency can be increased beyond a baseline frequency in a range of, for example, every 60-120 milliseconds, to an increased reporting rate, such as more frequently than every 60 milliseconds. Likewise, the power headroom reporting frequency can be increased beyond a baseline frequency in a range of, for example, every 60-120 milliseconds, to an increased reporting rate, such as more frequently than every 60 milliseconds. The increased buffer status reporting frequency and/or increased power headroom reporting frequency can be maintained until the wireless device reports an increase in power headroom, such as power headroom exceeding the predetermined threshold. The buffer status reporting frequency and/or power headroom reporting frequency can be returned to the baseline frequency based on the reported increase in power headroom.

Figure 5:
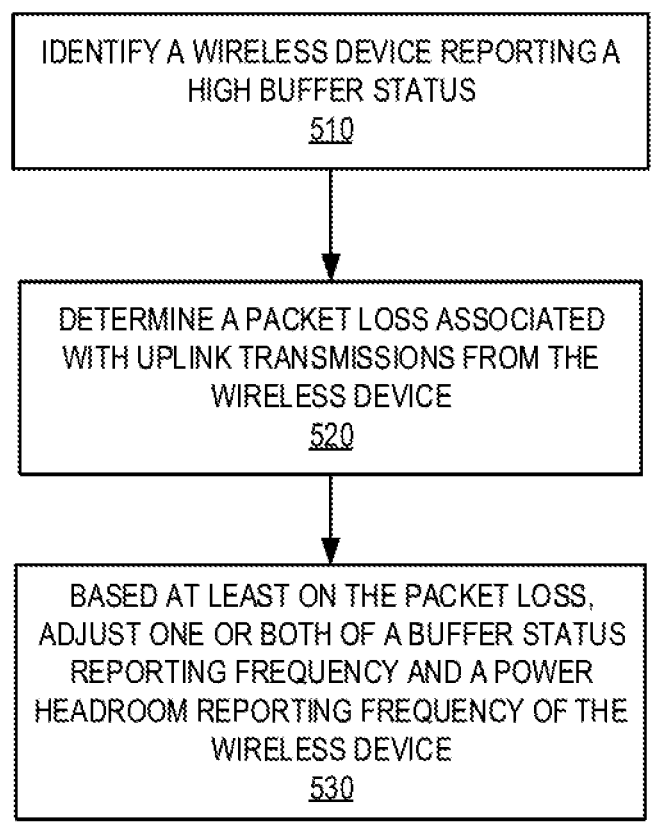
FIG. 5 depicts another exemplary method for adjusting a buffer status reporting frequency and/or power headroom reporting frequency of a wireless device.

FIG. 5 depicts an exemplary method for adjusting one or both of a buffer status reporting frequency and a power headroom reporting frequency of a wireless device. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 510, the method includes identifying a wireless device reporting a high buffer status, such as a buffer status above a predetermined threshold. Based on the identification of the wireless device reporting the high buffer status, the method includes, at 520, determining a packet loss occurring, for instance, as a result of congestion at a cell site router, as discussed above in connection with FIG. 3. At 530, based at least in part on the packet loss determined at 520, the method includes the method includes adjusting one or both of the buffer status reporting frequency and the power headroom reporting frequency of the wireless device. For example, the buffer status reporting frequency can be increased beyond a baseline frequency in a range of, for example, every 60-120 milliseconds, to an increased reporting rate, such as more frequently than every 60 milliseconds. Likewise, the power headroom reporting frequency can be increased beyond a baseline frequency in a range of, for example, every 60-120 milliseconds, to an increased reporting rate, such as more frequently than every 60 milliseconds. The increased buffer status reporting frequency and/or increased power headroom reporting frequency can be maintained until the wireless device reports a lower buffer status, such as a buffer status falling below the predetermined threshold. The buffer status reporting frequency and/or power headroom reporting frequency can be returned to the baseline frequency based on the wireless device reporting the lower buffer status.

Figure 6:
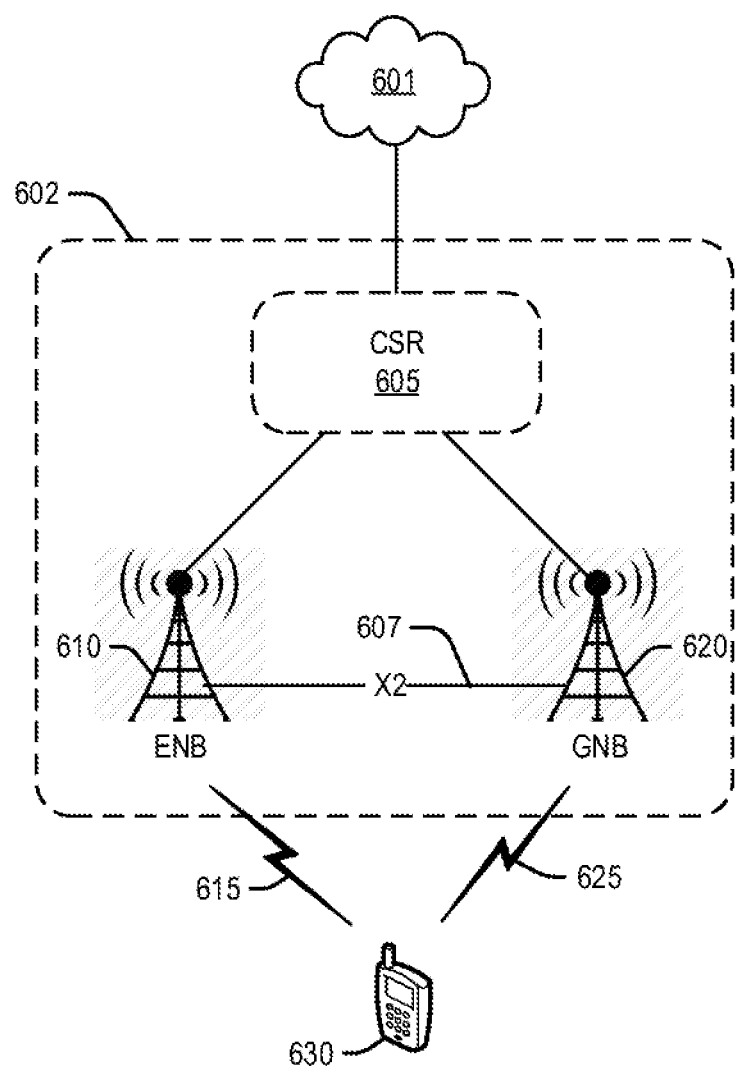
FIG. 6 depicts another exemplary system for adjusting a buffer status reporting frequency and/or power headroom reporting frequency of a wireless device.

Exemplary embodiments of the disclosure can be used with systems including multiple RATs. For example, FIG. 6 depicts an exemplary system 600 for E-UTRAN-NR Dual Connectivity (EN-DC) using 4G LTE and 5G NR. System 600 includes a communication network 601, a radio access network 602, and a wireless device 630. Radio access network further includes at least a cell site router 605, and access nodes 610, 620. Cell site router 605 can include any network node that is configured to route incoming data packets from network 601 to wireless device 630 via access node(s) 610, 620, and to route outgoing data packets received from the wireless device 630 via access node(s) 610, 620 to the network 601. Therefore, network 601 can include any combination of networks, including a core network, intermediate/backhaul network, or packet data network (PDN). Persons having ordinary skill in the art may note that although only access nodes 610, 620, cell site router 605, and network 601 are illustrated in FIG. 6, other components such as gateways, controller nodes, user plane functions, etc. may be included as well.

In this exemplary embodiment, access node 610 can include an eNodeB, and access node 620 can include a gNodeB. For example, access node 610 can be configured to deploy a wireless interface 615 using a first radio access technology (RAT), e.g. 4G LTE, and access node 620 can be configured to deploy a second wireless interface 625 using a second RAT, e.g. 5G NR. Each RAT can be configured to utilize a different frequency band or sub-band, a different channel size or bandwidth, and so on. For example, the 5G NR wireless interface 625 can be configured to utilize higher frequencies and larger channel bandwidths than the 4G LTE wireless interface 615. Further, access nodes 610, 620 can be configured to communicate using both RATs at the same time. For example, dual connections can be set up with wireless device 630 using both 4G and 5G air interfaces 615, 625 respectively, the 4G wireless interface 615 being used to transmit control information, and the 5G wireless interface 625 being used to transmit data information. For example, a processing node within system 600 (for example, communicatively coupled to access nodes 610, 620, or any other network node) can be configured to determine whether wireless device 630 is capable of communicating using both RATs, and instruct the access node 610 to broadcast an indicator in, for example, a system information message. Responsive to the indicator, wireless device 630 can attach to access node 610 which can use the 4G carrier to control and set up a dual connectivity session with wireless device 630. In other words, control information (including SIB messages) is transmitted from the access node 610 using the 4G LTE air interface, while the 5G NR air interface is utilized for transmission of data. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. In an exemplary embodiment utilizing multiple input multiple output (MIMO), wireless device 630 can receive a MIMO data stream using the 5G NR wireless interface, with control signaling that enables the MIMO data stream using the 4G wireless interface.

Further, within radio access network 602, access nodes 610 and 620 can be coupled via a direct communication link 607, which can include an X2 communication link. Access nodes 610 and 620 can communicate control and data information across X2 communication link 607. In an exemplary embodiment, the access node 620 includes logic that determines how to allocate data packets between access nodes 610 and 620.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: cell site router 115, gateway node(s) 102, controller node 104, access node 110, and/or network 101.

Figure 7:
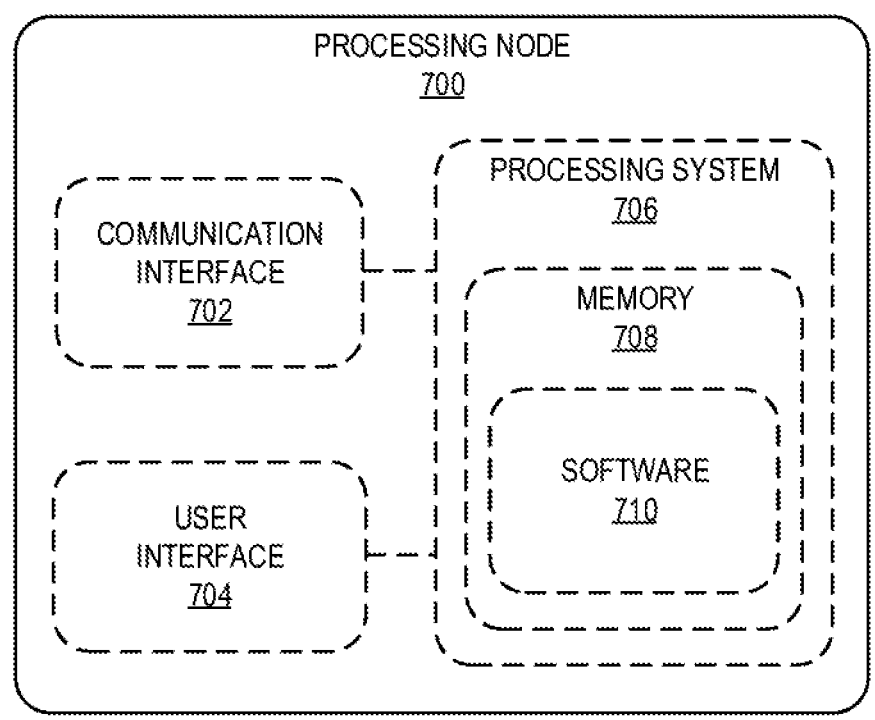
FIG. 7 depicts an exemplary processing node for adjusting a buffer status reporting frequency and/or power headroom reporting frequency of a wireless device.

FIG. 7 depicts an exemplary processing node for scheduling resources for relay access nodes in a wireless network. Processing node 700 comprises a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a module for performing transmission power control operations described herein. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for adjusting one or both of a buffer status reporting frequency and a power headroom reporting frequency of a wireless device, the method comprising:
   identifying a wireless device positioned at an edge portion of a coverage area of an access node;
   determining a packet loss associated with data transmission from the access node through a cell site router to an external network communicatively coupled to the cell site router; and
   based at least in part on the packet loss, adjusting one or both of a buffer status reporting frequency of the wireless device and a power headroom reporting frequency of the wireless device.

2. The method of claim 1, wherein adjusting one or both of a buffer status reporting frequency and a power headroom reporting frequency comprises increasing the buffer status reporting frequency beyond a baseline frequency.

3. The method of claim 2, further comprising returning the buffer status reporting frequency to the baseline frequency based on a position of the wireless device changing from a position at an edge of the coverage area of the access node to a position inside the edge of the coverage area of the access node.

4. The method of claim 1, wherein adjusting one or both of a buffer status reporting frequency and a power headroom reporting frequency comprises increasing the power headroom reporting frequency beyond a baseline frequency.

5. The method of claim 4, further comprising returning the power headroom reporting frequency to the baseline frequency based on a position of the wireless device changing from a position at an edge of the coverage area of the access node to a position inside the edge of the coverage area of the access node.

6. The method of claim 1, wherein identifying a wireless device positioned at an edge portion of a coverage area of the access node comprises identifying the wireless device based a high reported buffer status.

7. The method of claim 1, wherein identifying a wireless device positioned at an edge portion of a coverage area of the access node comprises identifying the wireless device based on a low reported power headroom.

8. The method of claim 1, wherein identifying a wireless device positioned at an edge portion of a coverage area of the access node comprises identifying the wireless device based on one or more of signal strength, power measurements, physical location of the wireless device, and modulation and coding scheme (MCS) used by the wireless device.

9. The method of claim 1, further comprising prioritizing allocation of resources of the access node to the wireless device.

10. The method of claim 9, wherein prioritizing allocation of resources of the access node to the wireless device comprises preferentially assigning frequency channels to the wireless device.

11. A system for adjusting one or both of a buffer status reporting frequency and a power headroom reporting frequency of a wireless device, the system comprising:
    an access node configured to provide wireless service to a wireless device attached to the access node;

a cell site router communicatively coupled to the access node, the cell site router configured to transmit data between the access node and an external network; and a processor communicatively coupled to the cell site router, the processor being configured to perform operations comprising:

identifying a wireless device reporting power headroom below a predetermined threshold to the access node;

determining a packet loss associated with data transmission from the access node through the cell site router to an external network communicatively coupled to the cell site router; and based at least in part on the packet loss, adjusting one or both of a buffer status reporting frequency of the wireless device and a power headroom reporting frequency of the wireless device.

12. The system of claim 11, wherein adjusting one or both of a buffer status reporting frequency and a power headroom reporting frequency comprises increasing the buffer status reporting frequency beyond a baseline frequency.

13. The system of claim 12, wherein the processor is further configured to return the buffer status reporting frequency to the baseline frequency based on a power headroom of the wireless device exceeding the predetermined threshold.

14. The system of claim 11, wherein adjusting one or both of a buffer status reporting frequency and a power headroom reporting frequency comprises increasing the power headroom reporting frequency beyond a baseline frequency.

15. The system of claim 14, wherein the processor is further configured to return the power headroom reporting frequency to the baseline frequency based on a power headroom of the wireless device exceeding the predetermined threshold.

16. The processing system comprising a processing mode for adjusting one or both of a buffer status reporting frequency and a power headroom reporting frequency of a wireless device, the processing node being configured to perform operations comprising:

identifying a wireless device reporting a buffer status above a predetermined threshold to an access node;

determining a packet loss associated with data transmission from the access node through a cell site router to an external network communicatively coupled to the cell site router; and based at least in part on the packet loss, adjusting one or both of a buffer status reporting frequency of the wireless device and a power headroom reporting frequency of the wireless device.

17. The processing system of claim 16, wherein adjusting one or both of a buffer status reporting frequency of the wireless device and a power headroom reporting frequency of the wireless device comprises increasing the buffer status reporting frequency beyond a baseline frequency.

18. The processing system of claim 17, wherein the processing node is further configured to return the buffer status reporting frequency to the baseline frequency based on a buffer status of the wireless device below the predetermined threshold.

19. The processing system of claim 16, wherein adjusting one or both of a buffer status reporting frequency of the wireless device and a power headroom reporting frequency of the wireless device comprises increasing the power headroom reporting frequency beyond a baseline frequency.

20. The processing system of claim 19, wherein the processing node is further configured to return the power headroom reporting frequency to the baseline frequency based on based on a buffer status of the wireless device below the predetermined threshold.

* * * * *